Oct. 13, 1953 T. A. CAMPBELL 2,655,287
FARM BUCKET PUMP AND BOOSTER GUN
Filed Jan. 13, 1949 3 Sheets-Sheet 1
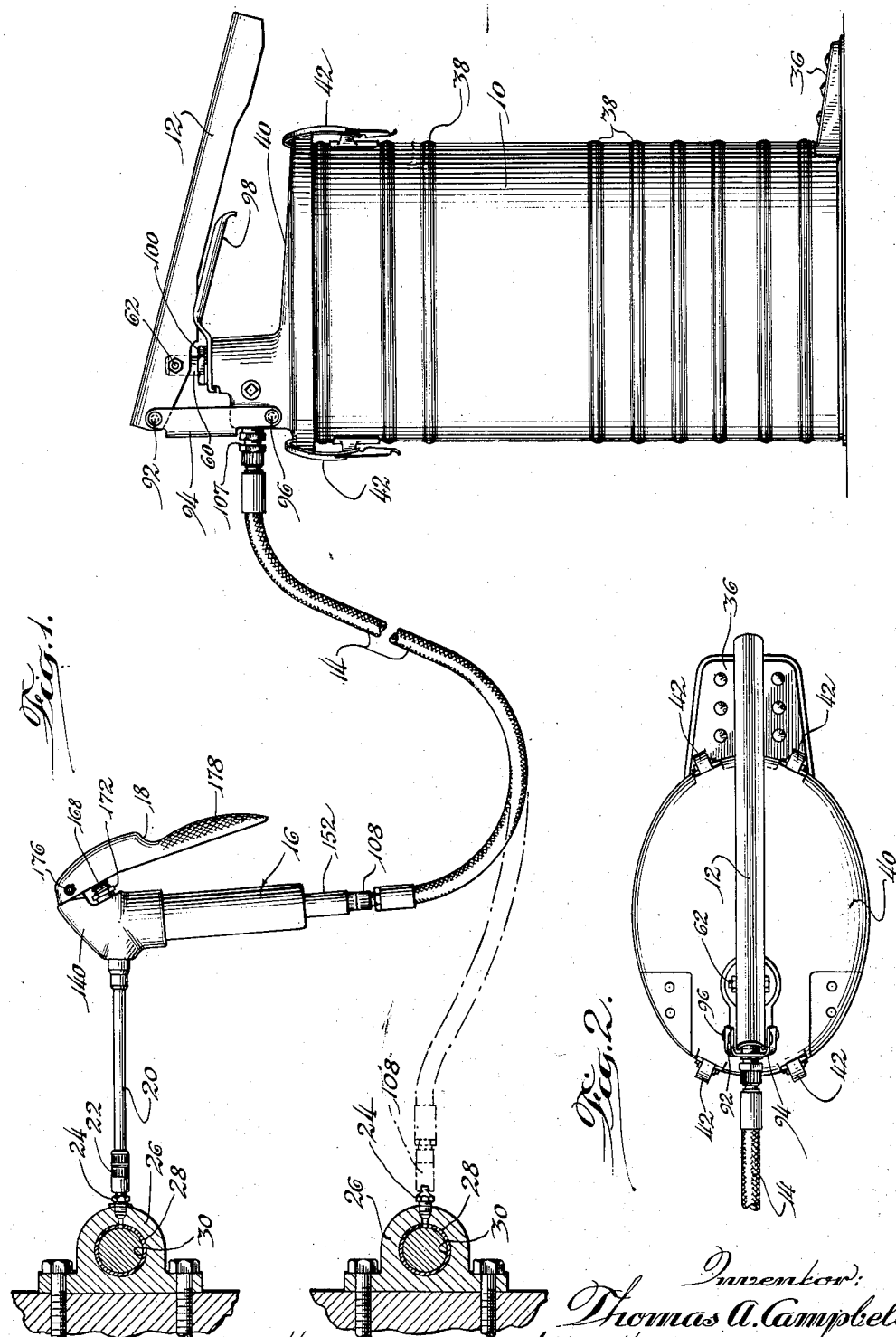

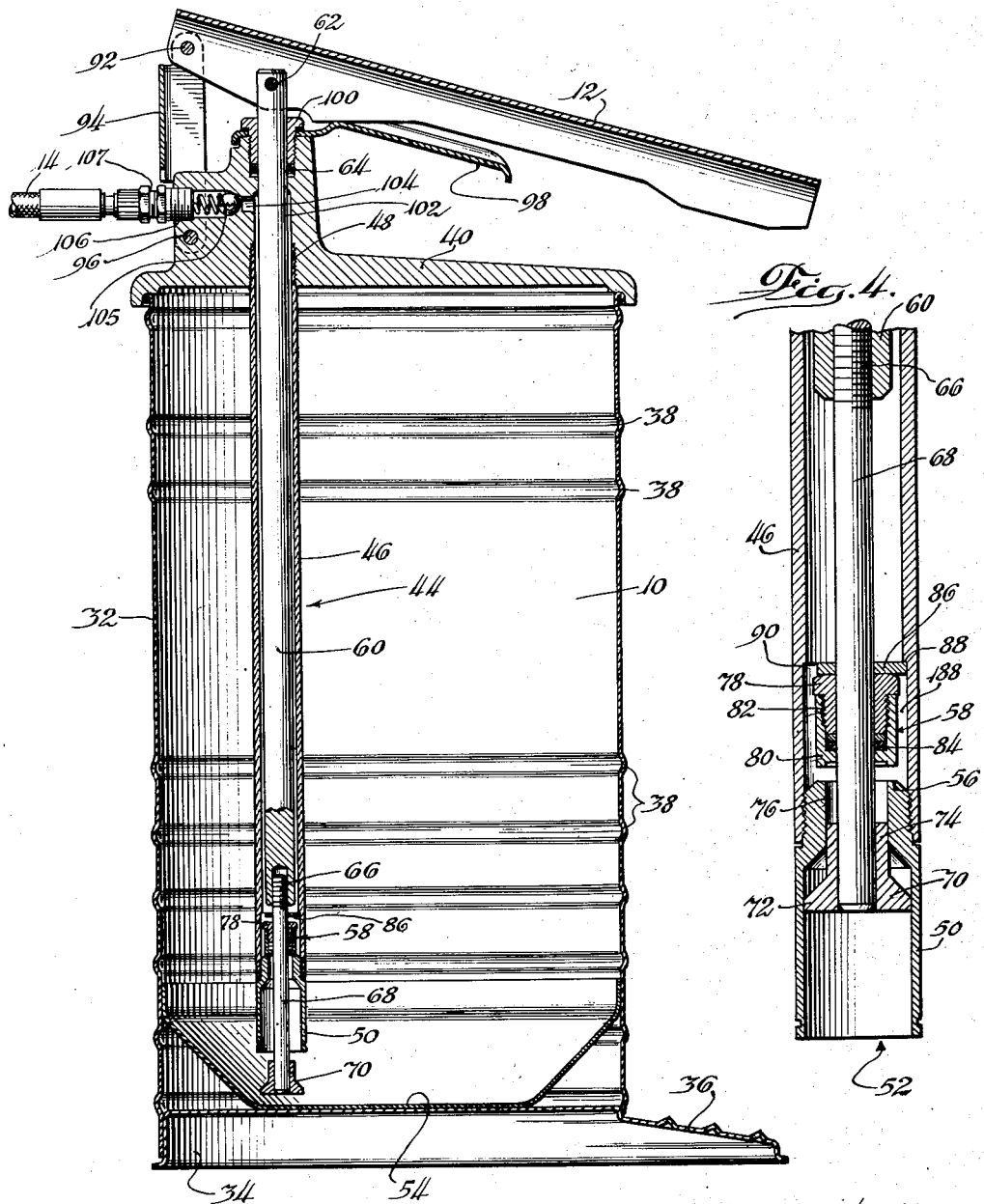

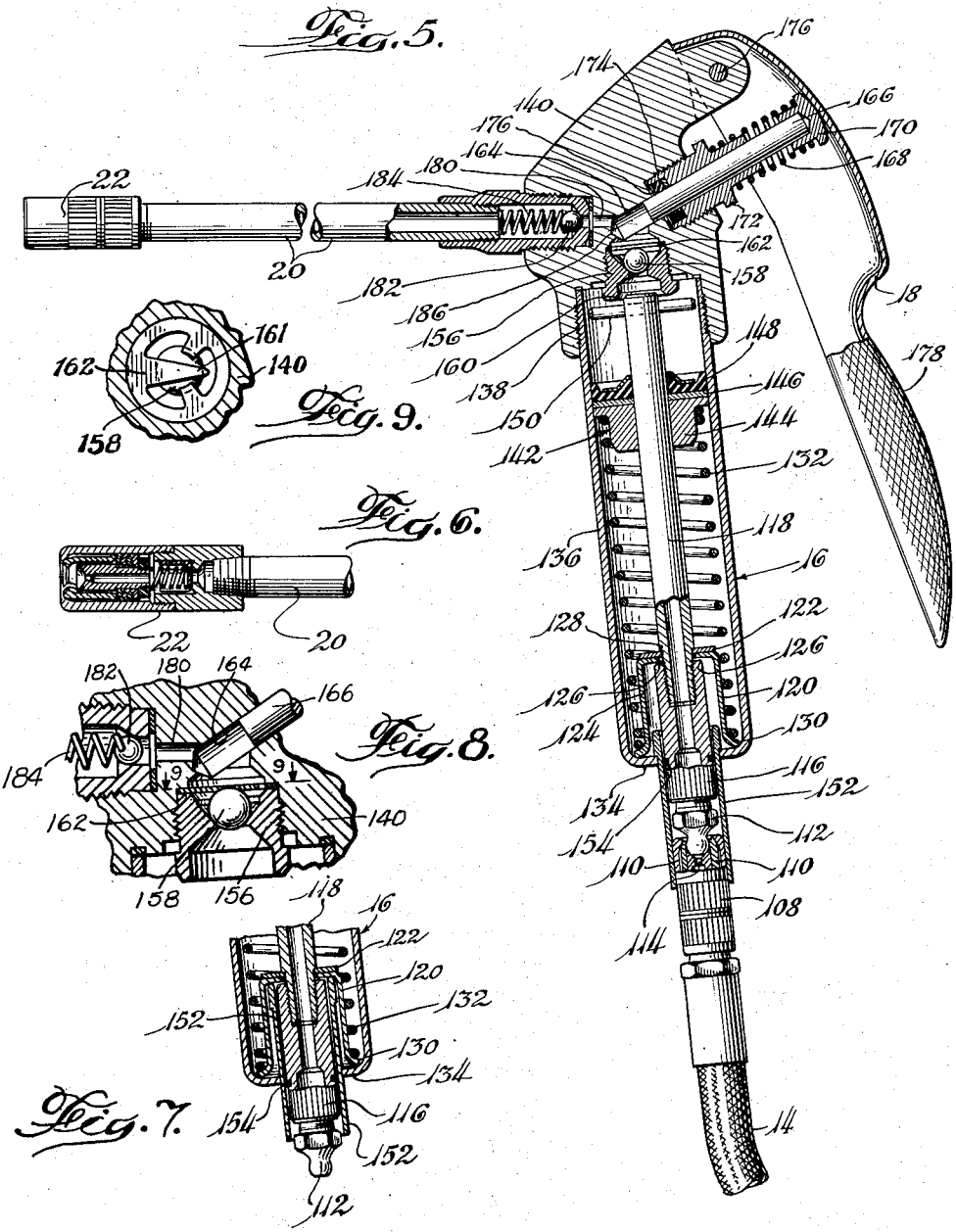

Patented Oct. 13, 1953

2,655,287

UNITED STATES PATENT OFFICE 2,655,287

FARM BUCKET PUMP AND BOOSTER GUN

Thomas A. Campbell, Chicago, Ill., assignor to Stewart-Warner Corporation, Chicago, Ill., a corporation of Virginia Application January 13, 1949, Serial No. 70,724

15 Claims. (Cl. 222—123)

My invention relates to a farm bucket pump and booster gun and is primarily concerned with a type of lubricant compressor equipment which is especially adapted to meet the needs of the individual farmer in the lubrication of his farm machinery.

Most farm machinery is provided with rather loosely fitting bearings which require only a relatively low pressure to force lubricant thereinto quickly and easily. In the last several years there has been a tendency to fit the bearings of some farm machinery more closely and a few of the bearings encountered by a farmer in lubricating his machinery may require relatively high pressure due either to closeness of bearing fit or more particularly to the accumulation of dirt and grease residue in a particular bearing.

One object of my invention is to provide a dual purpose type of lubricant compressor equally well adapted to provide rapid discharge of relatively large quantities of lubricant under low pressure and the discharge of lesser quantities of lubricant at relatively high or super-pressure readily at the will of the operator.

Some pieces of farm equipment are large and bulky so that the distance between a lubricant container located on the ground beside a piece of such machinery and bearings located adjacent the top of the machine is so great that it is inconvenient to lubricate such bearings through a continuous hose connection leading from the bearing to the lubricant reservoir on the ground. A further object of my invention is to provide a form of lubricant compressor having a sub-reservoir and pumping means quickly detached from the main lubricant container and pumping means for the lubrication of such bearings.

Still another object of my invention is to provide a lubricant compressor having two pumping means, either of which can be utilized to supply lubricant to a bearing. This feature is of particular importance where bearings are so located that the operator must assume a position which makes it awkward to use a particular hand to operate a pumping mechanism but where the other hand is readily available for such purpose.

A further object of my invention is to provide a dual purpose lubricant compressor wherein the supply of lubricant under low pressure can be supplemented or boosted at any time by a high pressure injection to clear out an obstruction and where the lubricating operation can thereafter be continued either as a low pressure or high pressure operation at the choice of the operator.

Still another object is to provide a new and improved lubricant compressor having novel structural features.

Other objects and advantages will become apparent as the description proceeds.

In the drawings:

Fig. 1 is a side elevational view of a farm bucket pump and booster gun embodying my invention. This figure also illustrates the manner in which such gun is connected to bearings for the lubrication thereof;

Fig. 2 is a top view of the bucket pump forming the right-hand portion of the apparatus shown in Fig. 1;

Fig. 3 is a vertical sectional view of my novel bucket pump;

Fig. 4 is an enlarged vertical sectional view of the cylinder and priming mechanism of the bucket pump of Fig. 3;

Fig. 5 is a view largely in longitudinal section of the booster and auxiliary reservoir;

Fig. 6 is a longitudinal sectional view of a lubricant coupler;

Fig. 7 is an enlarged longitudinal sectional view of that portion of the auxiliary reservoir which includes the means for quickly attaching it to and detaching it from the bucket pump.

Fig. 8 is an enlarged fragmentary longitudinal sectional view of the booster illustrating particularly the booster cylinder and its inlet valve; and Fig. 9 is an enlarged fragmentary sectional view taken as indicated by the line 9—9 of Fig. 8.

Referring more particularly to Fig. 1, it will be understood that I have illustrated therein a dual purpose high and low pressure lubricant compressor particularly adapted for supplying lubricant in succession to the several bearings of a farm machine or similar device through fittings or nipples permanently attached to the individual machine bearings. This lubricant compressor comprises a main or primary reservoir 10 having manually operated pumping mechanism actuated by a handle 12 whereby lubricant from the reservoir 10 is discharged into a flexible hose or conduit 14 leading to an auxiliary reservoir 16. A booster pumping mechanism may be actuated by a handle 18 to increase the pressure of the lubricant supplied by the low pressure pumping means as it enters the discharge pipe 20 terminating in a coupler 22 adapted to be attached in succession to a plurality of nipples or fittings 24 threaded or otherwise secured to the individual bearings 26 shown as having relatively movable bearing surfaces 28 and 30.

The main reservoir 10 may have a sheet metal wall 32 mounted on a sheet metal base 34 having an inclined rearward extension 36 forming a convenient footrest whereby pressure from the foot of the operator on the extension or footrest 36 holds the reservoir 10 and its associated pumping mechanism stationary during the operation of such pumping mechanism. The sheet metal wall 32 is shown in Fig. 2 as being of oval configuration in horizontal cross section but other configurations may be adopted if desired. This reservoir wall 32 may be rolled as indicated at 38 to increase its rigidity and to give it a more attractive appearance.

A cover 40 of cast metal or other suitable material overlies the upper end of the reservoir 10 and protects the contents thereof from dirt, water, and other contaminating materials. This cover is preferably of a type which may be quickly applied and removed and in Fig. 2 it is illustrated as being held in place by clips 42.

A pumping means indicated generally by reference character 44 is supported by the cover 40 and is actuated by the handle 12. This pumping means comprises a sleeve 46 whose upper end is threaded to the cover 40 as indicated at 48. The lower end of the sleeve 46 is threadedly attached to an inlet fitting 50 which is shown more clearly in Fig. 4. The inlet fitting 50 has a relatively large inlet opening 52 at its lower end, this opening being positioned somewhat above the base 54 of the reservoir for a purpose hereinafter described. The upper end 56 of the fitting 50 forms a seat for an inlet valve 58 which is shown in closed position in Fig. 3 and in open position in Fig. 4.

A rod 60, preferably of aluminum or other light and inexpensive material, is attached at its upper end to handle 12 by means of a pivot pin 62. This rod passes through the cover 40 and a packing gland 64 which prevents escape of lubricant along the rod. The lower end of the rod 60 is threaded at 66 to a priming rod 68 of smaller diameter than the rod 60 and preferably but not necessarily formed of steel. A priming button 70 is press fitted or otherwise attached to the lower end of the rod 68. The priming button 70 has a large diameter portion 72 which substantially fits the cylindrical lower end of the fitting 50 and a small diameter upper portion 74 which substantially fits the cylindrical upper end 76 of the fitting 50.

The valve 58 slidably surrounds the rod 68 and comprises members 78 and 80 which are threadedly connected as indicated at 82. Packing 84 is confined between the members 78 and 80 and presses firmly against the rod 68 to prevent escape of lubricant between the valve 58 and rod 68. The frictional engagement between packing 84 and rod 68 causes valve 58 to travel with rod 68 to the extent such travel is permitted by the valve seat 56 below valve 58 and stop washer 86 which limits upward movement of this valve. The stop washer 86 is press fitted into the lower end of tube 46 and rests against shoulder 88. This washer is provided with a cut-away portion 90 forming a lubricant passage therepast.

The actuating handle 12 for the low pressure pump is pivotally connected at 92 to the upper end of link 94 formed of sheet metal and having a central portion which is U-shaped in cross section. The lower end of link 94 is pivoted at 96 to the cover 40. The combined finger grip and stop for handle 12 is indicated by reference character 98 and is attached to the cover 40 by a threaded sleeve 100 forming a part of packing gland 64.

The upper end of sleeve 46 communicates with the flexible hose or conduit 14 by way of passages 102 and 104 and past discharge check valve 105 which is held in place by fitting 106 threaded into cover 40. The adjacent end of the flexible hose or conduit 14 is threaded into fitting 106 as indicated at 107. The other end of this conduit is provided with a lubricant coupler 108 (Fig. 5) which is preferably but not necessarily of the kind disclosed and claimed in my copending application Serial No. 793,130, filed December 22, 1947. This coupler has jaws 110 actuated by a lubricant pressure responsive system to grip the throat of a headed fitting or nipple 112 secured to the auxiliary reservoir 16. The coupler 108 also has a sealing means 114 of synthetic rubber or other suitable material for establishing a lubricant-tight seal between the coupler and fitting.

The fitting 112 is threadedly or otherwise attached to the lower or inlet end of a tubular member 116 whose other end is threaded to a tube 118 extending lengthwise of the reservoir 16. A washer 122 and the base of a sheet metal cup 124 are clamped between shoulders 126 and 128 provided respectively by tubular member 116 and tube 118. The rim of cup 124 is outwardly flared as indicated at 130 and forms a seat for a spring 132 which presses the rim 130 against the in-turned end 134 of reservoir cylinder 136. The upper end of cylinder 136 is threadedly attached at 138 to booster casting 140.

The upper end of spring 132 engages piston 142 and urges this piston upwardly in reservoir cylinder 136. This piston 142 may be formed in any suitable manner but is illustrated as comprising a base 144 of metal or other suitable material, a metal washer 146, and a sealing member 148 of synthetic rubber or like sealing material. A cross pin 150 is secured in the upper end of tube 118 and limits upward movement of the piston 142 so that this piston will not be forced out of the auxiliary reservoir cylinder 136 when the latter is unscrewed from the booster casting 140.

It will be noted that the tubular member 116 and tube 118 are not mechanically attached to the reservoir cylinder 136 but are floatingly mounted therein to permit automatic centering of these parts and piston 142 with respect to this cylinder. A sleeve 152 surrounds tubular member 116 and may be slid lengthwise thereof to outward position as shown in Fig. 5 or to inward position as shown in Fig. 7. In the position of Fig. 5 this sleeve surrounds the upper end of the coupler 108 and holds the coupler in axial alignment with the fitting 112, thereby preventing detachment of these parts since axial misalignment between the coupler and fitting is necessary to detach the coupler from the fitting. When the sleeve 152 is retracted as shown in Fig. 7, the coupler 108 may be readily detached from the fitting 112. A C-ring 154 located in an annular groove in tubular member 116 frictionally engages the sleeve 152 and holds it in selected position.

The upper end of auxiliary reservoir tube 118 terminates immediately adjacent the lower end of valve fitting 156 which is threaded into booster casting 140 and forms a seat for booster inlet valve 158. An annular passage 160 is provided between this fitting 156 and tube 118 whereby lubricant supplied through tube 118 may pass into reservoir 16 and whereby lubricant may be delivered by this reservoir to the booster inlet valve. The ball valve 158 when closed has its uppermost portion located about .010 of an inch below the tongue 161 of a flapper valve 162. This flapper valve is preferably formed of a disc of phosphor bronze or other spring-like material and is confined between the upper end of valve fitting 156 and the adjacent portion of booster casting 140.

A booster cylinder 164 is formed in casting 140 and is supplied with lubricant through inlet valve 156—158. A piston 166 is reciprocably mounted in cylinder 164 and is urged outwardly by a spring 168 confined between a cap 170 attached to the outer end of the piston 166 and a tubular fitting 172 which forces packing material 174 against the exterior of the piston and a shoulder 176 provided by casting 140.

The booster piston 166 is moved inwardly on its discharge stroke by handle 18 pivotally attached by pin 176 to the booster casting 140. The handle 18 has a gripping portion 178 in generally parallel relation to the auxiliary reservoir 16 so that the hand of the operator can encompass both the reservoir and handle 18 and by either squeezing or pushing can easily exert great force on this handle and its associated piston. It will be noted that the same spring which retracts the piston 166 also moves handle 18 to retracted position.

The booster cylinder 164 discharges through outlet passage 180 and past ball check valve 182 into discharge pipe 20 terminating in the coupler 22 for connection to the various fittings mounted on the bearings of the farm machine or other device to be lubricated. The check valve 182 is urged against its seat by a spring 184 with such force that a lubricant pressure, preferably about twice that exerted by the auxiliary piston 142, is required to open it.

It will be noted that the high pressure or booster cylinder 164 and its associated inlet and discharge passages are so constructed as to provide minimum spaces for the accumulation of air bubbles. Furthermore, the piston 166 travels the full length of the cylinder 164 whereby any air present in this cylinder is forced therefrom during the discharge stroke of the piston. A feature which reduces the cost of construction lies in the arrangement of the piston 166 and its packing 174 whereby this piston need not form a seal with the wall of cylinder 164, thereby avoiding the necessity of accurate machining and finishing of the respective surfaces.

It also will be noted that the high pressure or booster cylinder 164 has a conical extension 186 which communicates with both the inlet and outlet passages for this cylinder, even when the operator holds the booster piston 166 in its innermost position. This conical extension provides a by-pass around the high pressure cylinder so that operation of the low pressure compressor 44 can supply lubricant freely to the bearing parts of the machine being lubricated. This greatly increases the flexibility of the equipment since the operator need not concern himself with the position of the booster handle while he is operating the low pressure pumping mechanism.

With the apparatus assembled and applied to the fitting of a bearing as shown in Fig. 1 and with lubricant in the reservoir 10, such lubricant can be supplied to the bearing by manually operating the handle 12. Referring to Fig. 3 it will be seen that with the handle in the down position, shown in Fig. 1, the priming button 70 is located below the lower end of the fitting 50 and the inlet valve 58 is in its lower or closed position. The lower end of the fitting 50 under these conditions will normally be filled or substantially filled with lubricant and the initial upward movement of the handle 12 and priming button 70 will cause this button to force or tend to force additional lubricant into the lower end of the fitting 50 and simultaneously force the lubricant already in this fitting upwardly through the restricted bore 76 and past the valve seat 56 into the valve chamber 188. Such upward movement of the handle 12, rods 60 and 68, and priming button 70 will carry the inlet valve 58 upwardly until its movement is arrested by contact with the partition 86. Such upward movement of the valve 58 may also be assisted by the upward flow of the lubricant under the urging of priming button 70. The primary pumping chamber comprises the entire interior of the sleeve 46 above the check valve seat 56 and the capacity of this pumping chamber is increased by upward movement of handle 12 and rods 60 and 68 due to the difference in diameter of these two rods. The dynamic primer fitting 50 and button 70 is so constructed and arranged as to trap between 20% and 25% more lubricant than the primary pumping chamber can accommodate on each upstroke of the handle 12. The 20% to 25% excess lubricant by-passes the button 70 which has a clearance of .010 of an inch with respect to the fitting 50. This construction and arrangement of the primer insures complete filling of the primary pumping chamber on each priming stroke and also prevents air from being forced into the pumping chamber since air will more readily by-pass the priming button and any air trapped by the priming mechanism will be returned to the reservoir as part of the excess which the primary pumping chamber cannot accommodate.

The foregoing features of my novel dynamic primer contribute substantially to the success of the lubricating apparatus. Another advantage of this primer lies in the fact that the button 70 engages the restricted upper end of the fitting 50 to form a positive stop for further upward movement of the handle 12. During the operation of the handle 12 the operator preferably holds his foot on the etxension 36 of the bucket pump base.

The upstroke of the handle 12, just described, is immediately followed by a downward stroke in which the rods 60 and 68 are moved downwardly and the inlet valve 58 is shifted to closed position by virtue of the frictional engagement between this valve and the rod 68. Downward movement of the rods 60 and 68 causes more of the larger rod 60 to be introduced into the pumping chamber and more of the smaller rod 68 to be withdrawn therefrom. The resulting decrease in volume of the pumping chamber forces lubricant upwardly between the rod 60 and sleeve 46 and through passages 102 and 104 to the flexible hose or conduit 14. Downward movement of the priming button 70 creates a suction in the fitting 50 and as soon as the large end of this button clears the lower end of the fitting 50, lubricant is forced into the latter by air pressure acting on the upper surface of the lubricant in the reservoir 10. In this connection it is to be understood that the cover 40 does not form an air-tight seal with the upper end of the reservoir so that normal atmospheric pressure is always present on the upper surface of the lubricant in the reservoir 10. Downward movement of the handle 12 is arrested by its engagement with the stop 98.

As hereinabove pointed out, the lubricant displacement of the primary or low pressure pumping means just described is due to the difference in diameter of the rods 60 and 68 and this difference can be made of any desired value. The manual force which must be exerted on the handle 12 to create a given pressure on the lubricant is proportional in this difference in size of the two rods and also to the effective length of the handle itself. I have found that excellent results are obtained where the parts are given such values that a downward force of 100 pounds at the end of the handle 12 is capable of producing a lubricant pressure of 3500 pounds per square inch.

Lubricant discharged by the primary or low pressure pumping means flows through flexible hose 14, coupler 108, fitting 112, tubular member 116, and tube 118, to the upper end of auxiliary reservoir 16 to fill the space between the piston 142 and outlet check valve 182 of the booster pump. The check valve 158 offers no appreciable resistance to the inflow of lubricant so that the initial quantity of lubricant will readily flow therepast into the high pressure cylinder 164 and its discharge passage 180.

Since the effective strength of the spring 184 of outlet check valve 182 is approximately twice that of reservoir spring 132, further lubricant supplied by the low pressure pumping means will push back the piston 142 and fill the auxiliary reservoir 16 until the piston 142 engages washer 122; whereupon further flow of lubricant into the reservoir is terminated and all lubricant thereafter supplied by the low pressure pumping means will open the outlet check valve 182 and flow into discharge pipe 20 and through coupler 22 and the fitting to which it is attached and thence into the bearing surfaces. It will be noted that lubricant supplied by the low pressure pumping means cannot enter the discharge conduit 20 until the auxiliary reservoir 16 is completely filled.

The operator of the apparatus may accidently or otherwise hold the handle 178 of the booster in close proximity to the auxiliary reservoir 38, thereby maintaining the booster piston 166 in advanced position. This, however, will not prevent or impede the supply of lubricant under low pressure to the bearing since the conical extension 186 of the booster cylinder provides a suitable by-pass around that cylinder for this purpose. Where it is desired to use the booster handle to hold the discharge coupler on a fitting, this is a matter of great convenience and a very desirable feature of my invention.

In most instances the pressure developed by the low pressure pumping means is sufficient to supply lubricant to the bearing rapidly and it is unnecessary to use the booster to increase the pressure of the delivered lubricant. However, where a tight or clogged bearing is encountered, the operator can instantly increase the pressure of the lubricant being delivered by moving the booster handle 178 toward the auxiliary reservoir 16. This instantaneous increase in delivered pressure is made possible by the fact that the booster inlet check valve 158 is held closely adjacent its seat by the tongue 161 of disc 162 so that this valve closes immediately with the first inward movement of the booster piston and all subsequent movement of this piston is available to increase the discharge pressure of the lubricant. Frequently, a single stroke or less of the booster piston is adequate to free the bearing and thereafter the low pressure pumping means can be operated again to supply the desired amount of lubricant at a faster rate. In those instances where the bearing resistance remains high, the operator continues to operate the booster pumping mechanism until the desired amount of lubricant has been supplied by the bearing.

The resilient auxiliary reservoir 16 facilitates this lubricating operation by providing at all times a source of supply of lubricant for the booster mechanism. This makes it unnecessary to operate the low pressure pumping means during the operation of the booster mechanism and greatly increases the facility of manipulation of the apparatus as well as the rapidity with which a machine may be completely lubricated.

As soon as a bearing has received the desired amount of lubricant, the coupler 22 is disconnected from the fitting 24 and moved into engagement with the fitting on the next bearing to be lubricated. The connection formed between the flexible conduit 14 and auxiliary reservoir 16 is of the swivel type by virtue of the fact that the coupler 108 can swivel about the axis of the fitting 112. This feature is advantageous in lubricating a large bulky farm machine and increases the adaptability of the lubricating apparatus to meet varying conditions resulting from relatively inaccessible locations of lubricant-receiving fittings.

While the maximum pressure which the booster can develop for a given force on the booster handle can be made any desired amount within wide limits by selecting the appropriate diameter of booster piston, I have found that excellent results are obtained where the booster will give a pressure of 10,000 pounds per square inch when operated with one hand. If the operator chooses to use two hands, he can of course greatly increase the maximum pressure at which lubricant can be delivered. Ordinarily, it is more desirable to supply lubricant directly from the low pressure pumping means where this is possible because of the greater volume delivery of such means. In certain situations, however, this might require undesirable stretching on the part of the operator and he may prefer to supply the desired quantity of lubricant entirely from the operation of the booster because of the more convenient location of the booster handle in a given situation. This choice of pumping means is another advantage of my invention.

When it is desired to lubricate bearings which are out of range of the apparatus, as long as the booster and auxiliary reservoir are connected to the low pressure pumping means, the booster and auxiliary reservoir may be readily disconnected by moving sleeve 152 from the position shown in Fig. 5 to the position shown in Fig. 7 and then detaching the coupler 108 from the fitting 112. The auxiliary reservoir holds enough lubricant adequately to lubricate the bearings of a piece of farm machinery so that the booster and auxiliary reservoir with their associated discharge pipe and coupler can be connected successively with those bearings out of range of the dual purpose compressor when the parts thereof are assembled as shown in full lines in Fig. 1.

In some instances it may be preferred to connect the coupler 108 on the flexible hose 14 directly to a bearing nipple or fitting 24 as shown in dot and dash lines in Fig. 1. With this arrangement of the equipment the handle 12 of the low pressure compressing means may be operated to supply the desired amount of lubricant rapidly.

In case it becomes desirable for any reason to unscrew the auxiliary reservoir 16 from the booster casting 140, such disassembly of these parts will not interefere with the assembly of the parts in the auxiliary reservoir itself since pin 150 will prevent reservoir spring 132 from forcing the piston 142 or any of its component parts out of the open end of the reservoir. I also wish to call attention to the fact that this piston and its associated parts are self-centering in the reservoir, so that extreme accuracy in manufacture to avoid binding or sticking is unnecessary. Likewise, booster piston 166 is not subject to binding or sticking because of slight misalignment, and here again, expensive manufacturing techniques are avoided.

While I have illustrated and described only a single embodiment of my invention it is to be understood that my invention may assume numerous forms and includes all modifications, variations, and equivalents coming within the scope of the appended claims.

I claim:

1. In lubricating apparatus of the class described, the combination of a main reservoir, relatively low pressure pumping means associated with and supplied from said reservoir, a flexible discharge conduit for said pumping means terminating in a coupler, an auxiliary reservoir attached to said coupler, a piston reciprocably mounted in said reservoir, a spring for urging said piston in one direction, a booster pump associated with said auxiliary reservoir, rigid discharge conduit for said booster pump, a second coupler mounted on the outlet end of said rigid conduit, a check valve interposed between said booster pump and said second coupler, and a spring for said check valve having an effective strength greater than said first-named spring whereby lubricant discharged by said low pressure pumping means must fill said auxiliary reservoir before being discharged through said second coupler.

2. In lubricating apparatus of the class described, comprising a first reservoir, a relatively low pressure lubricant compressor mounted therein and supplied therefrom, a discharge conduit for said lubricant compressor, a second lubricant compressor connected to said discharge conduit and supplied therefrom, said second lubricant compressor being operable to increase the pressure of lubricant delivered by said first-mentioned compressor, an auxiliary reservoir communicating with said conduit between said first and second compressors, means for discharging lubricant from said auxiliary reservoir, a second discharge conduit for said second compressor, and means interposed between said second compressor and said second discharge conduit for preventing discharge of lubricant through said second conduit under pressure developed by said first compressor until said auxiliary reservoir is filled.

3. In lubricating apparatus of the class described, the combination of a main reservoir, relatively low pressure pumping means associated with and supplied from said reservoir, a flexible discharge conduit for said pumping means terminating in a coupler, an auxiliary reservoir attached to said coupler, a piston reciprocably mounted in said reservoir, a spring for urging said piston in one direction, a booster pump associated with said auxiliary reservoir, rigid discharge conduit for said booster pump, a second coupler mounted on the outlet end of said rigid conduit, a check valve interposed between said booster pump and said second coupler, a spring for said check valve having an effective strength greater than said first-named spring whereby lubricant discharged by said low pressure pumping means must fill said auxiliary reservoir before being discharged through said second coupler, and a check valve interposed between said booster pump and auxiliary reservoir.

4. In lubricating apparatus of the class described, comprising a first reservoir, a relatively low pressure lubricant compressor mounted therein and supplied therefrom, a discharge conduit for said lubricant compressor, a second lubricant compressor connected to said discharge conduit and supplied therefrom, said second lubricant compressor being operable to increase the pressure of lubricant delivered by said first-mentioned compressor, an auxiliary reservoir communicating with said conduit between said first and second compressors, means for discharging lubricant from said auxiliary reservoir, a second discharge conduit for said second compressor, means interposed between said second compressor and said second discharge conduit for preventing discharge of lubricant through said second conduit under pressure developed by said first compressor until said auxiliary reservoir is filled, and a quickly detachable connection between said first compressing means and said auxiliary reservoir.

5. In lubricating apparatus of the class described, comprising a main lubricant reservoir, compressing means associated therewith and supplied therefrom, a discharge conduit for said compressing means, an auxiliary reservoir supplied through said conduit, said reservoir comprising a cylinder, a hollow piston reciprocable therein, a rigid tube extending through said hollow piston and slidable relative thereto, a sheet metal cup secured to one end of said tube, a spring interposed between said cup and said piston for advancing said piston in one direction, a tubular member attached to said end of said tube and extending through a wall of said reservoir in spaced relation thereto whereby said tube, cup, and piston are floatingly mounted in said reservoir without mechanical attachment thereto, a lubricant-receiving fitting attached to said tubular member, a coupler attached to said discharge conduit and engaging said fitting, a sleeve slidable between said tubular member and sheet metal cup and adapted to lock said coupler on to said fitting, a booster receiving lubricant from said auxiliary reservoir, a discharge conduit for said booster, and a check valve interposed between said booster and its discharge conduit, said check valve being openable under lubricant pressure greater than that required to compress the spring of said auxiliary reservoir.

6. In lubricating apparatus of the class described, comprising a first reservoir, a relatively low pressure lubricant compressor mounted therein and supplied therefrom, a discharge conduit for said lubricant compressor, a second lubricant compressor connected to said discharge conduit and supplied therefrom, said second lubricant compressor being operable to increase the pressure of lubricant delivered by said first-mentioned compressor, an auxiliary reservoir communicating with said conduit between said first and second compressors, means for discharging lubricant from said auxiliary reservoir, a second discharge conduit for said second compressor, means interposed between said second compressor and said second discharge conduit for preventing discharge of lubricant through said second conduit under pressure developed by said first compressor until said auxiliary reservoir is filled, an inlet check valve for said second compressor, said check valve including a ball biased toward its seat, and a flapper valve spaced a short distance away from said ball whereby said ball engages its seat immediately upon the operation of said second compressor.

7. In lubricating apparatus of the class described, the combination of a main reservoir, relatively low pressure pumping means associated with and supplied from said reservoir, a flexible discharge conduit for said pumping means terminating in a coupler, an auxiliary reservoir attached to said coupler, a piston reciprocably mounted in said reservoir, a spring for urging said piston in one direction, a booster pump associated with said auxiliary reservoir, rigid discharge conduit for said booster pump, a second coupler mounted on the outlet end of said rigid conduit, a check valve interposed between said booster pump and said second coupler, a spring for said check valve having an effective strength greater than said first-named spring whereby lubricant discharged by said low pressure pumping means must fill said auxiliary reservoir before being discharged through said second coupler, said booster pump including a cylinder having a tapered end providing inlet and outlet passages for said cylinder, and a piston reciprocable in said cylinder but of such size that it cannot enter said tapered end, whereby said tapered end forms a by-pass for lubricant discharged by said low pressure pumping means when said booster piston is in fully advanced position.

8. Lubricating apparatus of the class described, comprising a sleeve for extending into a lubricant reservoir, an annular inlet check valve at the lower end of said sleeve, an annular shoulder inside the sleeve below the check valve forming a seat for the latter, a rod reciprocable in said sleeve for discharging lubricant therefrom, a discharge outlet communicating with said sleeve, a tubular extension attached to the lower end of said sleeve and having an open lower end, a second rod attached to said first-named rod and extending through said inlet check valve and tubular extension, said second rod being of smaller diameter than said first-mentioned rod, a priming button attached to said second rod, a packing ring between the inlet check valve and the second rod forming a frictional driving connection therebetween, and means on the sleeve forming an upper stop engageable with the inlet check valve during upward movement of the rods.

9. In lubricating apparatus of the class described, the combination of a main reservoir, relatively low pressure pumping means associated with and supplied from said reservoir, a member for operating said means, a flexible discharge conduit for said pumping means terminating in a coupler, an auxiliary reservoir attached to said coupler, a piston reciprocably mounted in said reservoir, a spring for urging said piston in one direction, a booster pump associated with said auxiliary reservoir, a second member for operating said booster pump, rigid discharge conduit for said booster pump, a second coupler mounted on the outlet end of said rigid conduit, a check valve interposed between said booster pump and said second coupler, and a spring for said check valve having an effective strength greater than said first-named spring whereby lubricant discharged by said low pressure pumping means must fill said auxiliary reservoir before being discharged through said second coupler.

10. A farm bucket pump and booster gun having selective lubricant delivery means and comprising a first reservoir, a relatively low pressure lubricant compressor mounted therein and supplied therefrom, a handle for said compressor, a discharge conduit for said lubricant compressor, a second lubricant compressor connected to said discharge conduit and supplied therefrom, a second operating handle for said second compressor, said second lubricant compressor being operable to increase the pressure of lubricant delivered by said first-mentioned compressor, an auxiliary reservoir communicating with said conduit between said first and second compressors, means for discharging lubricant from said auxiliary reservoir, a second discharge conduit for said second compressor, and means interposed between said second compressor and said second discharge conduit for preventing discharge of lubricant through said second conduit under pressure developed by said first compressor until said auxiliary reservoir is filled.

11. In lubricating apparatus of the class described, the combination of a base adapted to rest on the ground, a main reservoir mounted on said base, a low pressure pumping means carried by said base and supplied from said reservoir, a handle for operating said compressing means, a foot support provided by said base whereby an operator's foot can be used to hold said base in fixed position, a flexible discharge conduit for said compressing means, an auxiliary reservoir connected to said conduit, a booster pump associated with said auxiliary reservoir and capable of increasing pressure on lubricant delivered by said first-mentioned compressing means, said booster pump and auxiliary reservoir also being capable of conducting lubricant to a bearing under pressure supplied by said low pressure pumping means, said booster pump and auxiliary reservoir being manually portable, a coupler for connecting said booster with a lubricant-receiving fitting, and quickly detachable means interposed between said auxiliary reservoir and flexible conduit whereby said auxiliary reservoir and booster pump may be detached from said low pressure compressor and first-mentioned reservoir for reaching bearings located beyond the range of said flexible conduit, said quickly detachable means including a coupler adapted for attachment to a lubricant-receiving fitting of the kinds commonly associated with machine bearings.

12. In lubricating apparatus of the class described, comprising a lubricant reservoir having a cylinder, a hollow piston reciprocable therein, a rigid tube extending through said hollow piston and slidable relative thereto, a sheet metal cup secured to one end of said tube, a spring interposed between said cup and said piston for advancing said piston in one direction, and a tubular member attached to said end of said tube and extending through a wall of said reservoir in spaced relation thereto whereby said tube, cup, and piston are floatingly mounted in said reservoir without mechanical attachment thereto.

13. Lubricating apparatus of the class described, comprising a reservoir, a pumping chamber supplied from said reservoir, an inlet check valve for said chamber, means for discharging lubricant from said chamber, and priming means for said chamber including a two-diameter tubular extension attached to the lower end of said chamber and having an open lower end spaced above the bottom of said reservoir, a rod attached to said discharge means and extending through said check valve and tubular extension, and a two-diameter priming button attached to said rod.

14. In lubricating apparatus of the class described, the combination of a main reservoir, relatively low pressure pumping means associated with and supplied from said reservoir, a flexible discharge conduit for said pumping means terminating in a coupler, an auxiliary reservoir attached to said coupler, a piston reciprocably mounted in said auxiliary reservoir, a spring for urging said piston in one direction, a booster pump associated with said auxiliary reservoir, rigid discharge conduit for said booster pump, a second coupler mounted on the outlet end of said rigid conduit, a check valve interposed between said booster pump and said second coupler, a spring for said check valve having an effective strength greater than said first-named spring whereby lubricant discharged by said low pressure pumping means must fill said auxiliary reservoir before being discharged through said second coupler, said booster pump including a cylinder having a part providing inlet and outlet passages for said cylinder, and a piston reciprocable in said cylinder but of such size that it cannot enter said part, whereby said part forms a by-pass for lubricant discharged by said low pressure pumping means when said booster piston is in fully advanced position.

15. Lubricant pumping apparatus of the class described, comprising a sleeve adapted to extend into a lubricant reservoir, an annular inlet check valve movable in the sleeve adjacent its lower end, an annular shoulder inside the sleeve below the check valve forming a seat for the latter, a rod reciprocable in the sleeve for discharging lubricant therefrom, a discharge outlet communicating with the sleeve, a second rod attached to the first named rod and extending through the inlet check valve, the second rod having a smaller diameter than the first rod, a packing ring between the inlet check valve and the second rod forming a frictional driving connection therebetween, and means attached to the sleeve forming an upper stop engageable with the check valve during upward movement of the rods.

THOMAS A. CAMPBELL.

References Cited in the file of this patent

UNITED STATES PATENTS

| Number | Name | Date |
| --- | --- | --- |
| 1,804,449 | Woodruff | May 12, 1931 |
| 1,804,582 | Woodruff | May 12, 1931 |
| 2,308,864 | Davis | Jan. 19, 1943 |
| 2,403,122 | Reisert | July 2, 1946 |
| 2,510,972 | Gray | June 13, 1950 |